(12) United States Patent
Tian

(10) Patent No.: US 11,608,172 B2
(45) Date of Patent: Mar. 21, 2023

(54) VERTICAL TAKEOFF AND LANDING UAV

(71) Applicant: Shanghai Autoflight Co., Ltd., Kunshan (CN)

(72) Inventor: Yu Tian, Hong Kong SAR (CN)

(73) Assignee: SHANGHAI AUTOFLIGHT CO., LTD., Jiangsu Province (CN)

( * ) Notice: Subject to any disclaimer, the term of this patent is extended or adjusted under 35 U.S.C. 154(b) by 0 days.

(21) Appl. No.: 17/827,490

(22) Filed: May 27, 2022

(65) Prior Publication Data

US 2022/0380047 A1    Dec. 1, 2022

(51) Int. Cl.
*B64C 39/02*     (2006.01)
*B64C 25/06*     (2006.01)
*B64C 29/00*     (2006.01)

(52) U.S. Cl.
CPC ............ *B64C 39/024* (2013.01); *B64C 25/06* (2013.01); *B64C 29/0008* (2013.01); *B64C 2201/02* (2013.01)

(58) Field of Classification Search
CPC ... B64C 39/024; B64C 25/06; B64C 29/0008; B64C 2201/02; B64C 25/10; B64C 25/32; B64C 25/40
See application file for complete search history.

(56) References Cited

U.S. PATENT DOCUMENTS

| | | | | |
|---|---|---|---|---|
| 2010/0252678 A1* | 10/2010 | Luce | ...................... | B64C 25/00 244/100 R |
| 2019/0233107 A1* | 8/2019 | Tian | ...................... | B64C 39/024 |
| 2020/0122822 A1* | 4/2020 | Bosworth | ............... | B64C 25/58 |
| 2020/0174478 A1* | 6/2020 | Abdellatif | ............... | B60B 19/12 |
| 2020/0298816 A1* | 9/2020 | Wilson | .................... | B64C 25/10 |

* cited by examiner

*Primary Examiner* — Rodney A Bonnette
(74) *Attorney, Agent, or Firm* — WPAT Law, P.C.; Anthony King

(57) ABSTRACT

A vertical takeoff and landing (VTOL) UAV having a UAV main body, two rear landing gears and two front landing gears; the two rear landing gears are fixedly connected to both sides of the rear bottom of the UAV main body, respectively; the two front landing gears are rotatably connected to both sides of the front bottom of the UAV main body, respectively. One end of the front landing gear away from the UAV main body is provided with a locating block. Rotating the front landing gear enables the locating block mounted on the front landing gear to get close to or away from the UAV main body.

16 Claims, 2 Drawing Sheets

VERTICAL TAKEOFF AND LANDING UAV

TECHNICAL FIELD

The application relates to the technical field of UAV, in particular to a VTOL UAV.

BACKGROUND ART

The traditional UAV usually adopts the front three-point or rear three-point landing gears, that is, one landing gear is in the front of the aircraft, two landing gears are in the rear of the aircraft, or vice versa. The above landing gear arrangement in the application of VTOL UAV will result in uneven overall stress distribution of UAV, and the excessive bearing capacity of landing gear arranged separately will easily cause damage to UAV. When the UAV is not working, it is necessary to ensure the locating effect of the UAV itself to avoid deviation or overturning due to accidents.

SUMMARY OF THE APPLICATION

The purpose of the application is to provide a VTOL UAV to solve the problems of uneven stress and poor locating effect of the UAV.

To achieve this purpose, the application adopts the following technical solution:

A VTOL UAV, which comprises a UAV main body, two rear landing gears and two front landing gears; the two rear landing gears are fixedly connected to both sides of the rear bottom of the UAV main body, respectively; the two front landing gears are rotatably connected to both sides of the front bottom of the UAV main body, respectively. One end of the front landing gear away from the UAV main body is provided with a locating block. Rotating the front landing gear enables the locating block mounted on the front landing gear to get close to or away from the UAV main body. The locating block is equipped with a locating component, which can be connected to the ground.

Wherein, the locating component comprises a lifting rod and an adsorption unit arranged at the bottom end of the lifting rod, the lifting rod can rise or fall relative to the locating block, and the adsorption unit can be adsorbed onto the ground.

The adsorption unit comprises an adsorption suction cup and a vacuumize parts connected with the adsorption suction cup, and the vacuumize parts is used to vacuumize.

The vacuumize parts comprises a piston body.

The locating component also comprises a piston body control unit, which is used to control the piston body.

The piston body control unit is connected to the piston body through communication. An avoidance hole is arranged the middle of the locating block, and the lifting rod passes through the avoidance hole.

The locating component also comprises a spring, the spring is sleeved with the lifting rod, and both ends are connected to the lifting rod and the locating block, respectively.

The adsorption suction cup is made of silica gel.

One end of the rear landing gear away from the UAV body is provided with a locating block.

The beneficial effects of the application:

Setting two front landing gears and two rear landing gears improves the stress condition of the VTOL UAV, so as to reduce the potential safety hazards caused by the excessive bearing capacity of the landing gears. The arrangement of the locating block improves the wear resistance of the front landing gear. The rotating connection between the front landing gear and the UAV main body facilitates the operator to adjust the distance between the front bottom of the UAV main body and the ground. The arrangement of the locating component enables the VTOL UAV to be firmly connected to the ground in the non-working state, so as to ensure the locating effect of the VTOL UAV and avoid the risk of deviation or overturning of the VTOL UAV.

Wherein,

100. UAV main body; 110. Front landing gear; 120. Rear landing gear; 130. Locating block; 131. Lifting rod; 132. Adsorption suction cup; 133. Spring.

DETAILED DESCRIPTION

In order to make clearer the technical problems solved, the technical solution adopted and the technical effect achieved by the application, the technical solution of the embodiment of the application will be further described in detail below in combination with the attached figures. Obviously, the described embodiments are only part of the embodiments of the application, not all of the embodiments. Based on the embodiments of the application, all other embodiments obtained by those skilled in the art without creative work fall within the breadth and scope of the application.

In the description of the application, it should be noted that unless otherwise specified and limited, the terms, "connect", "connection", and "fixation" should be understood in a broad sense. For example, it can be fixedly connected, detachably connected, or integrated. It can be mechanical connection or electrical connection. It can be connected directly or indirectly through an intermediate medium, and it can be the connection between the two components. For those skilled in the art, the specific meaning of the above terms in the application can be understood in specific circumstances.

In the application, unless otherwise clearly specified and limited, the first feature "on" or "under" the second feature may include the direct contact between the first and second features, or the contact between the first and second features that is not direct contact, but through another feature between them. Moreover, the first feature "on", "over", and "above" the second feature may include the first feature directly above and obliquely above the second feature, or only indicates that the horizontal height of the first feature is higher than the second feature. The first feature "under", "below" and "beneath" the second feature, may include the first feature directly below and obliquely below the second feature, or only indicate that the horizontal height of the first feature is smaller than that of the second feature.

The technical solution of the application is further described below in combination with the attached figures and through the embodiments.

Figure 1:
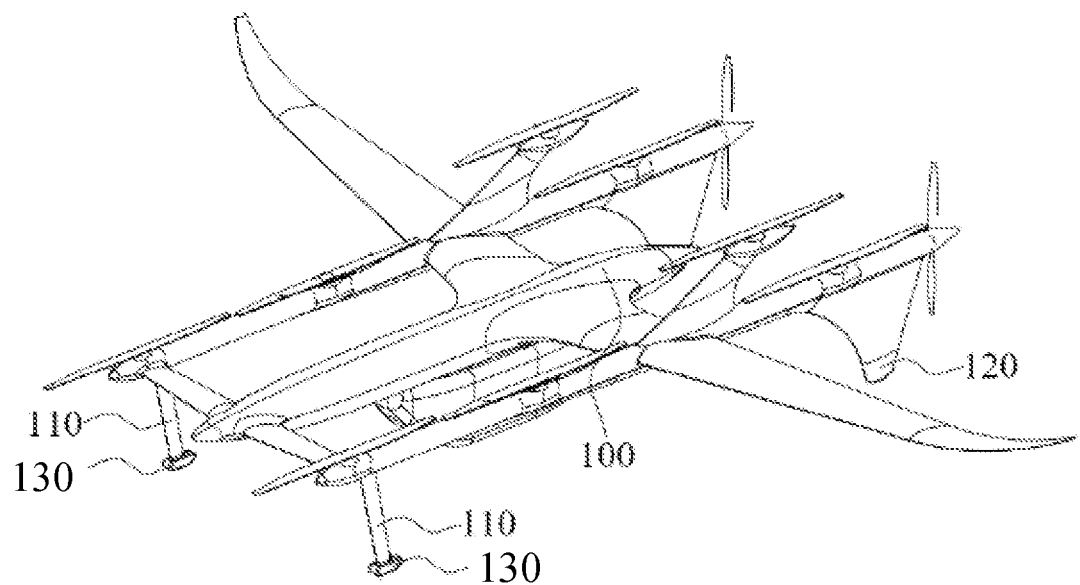
FIG. 1 is the structural diagram of the VTOL UAV provided by the embodiment of the application.
Figure 2:
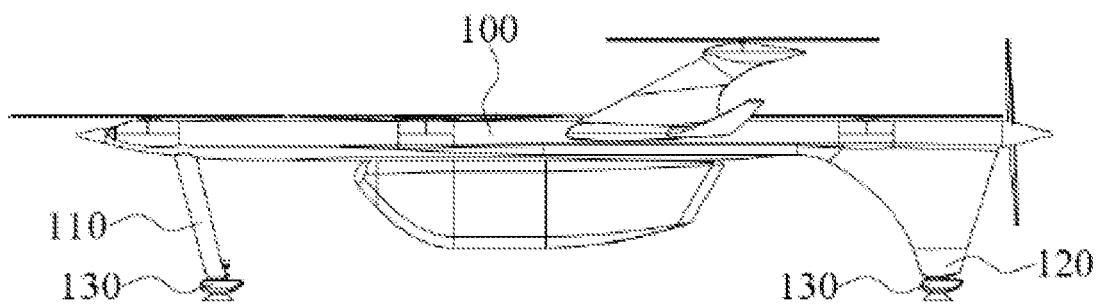
FIG. 2 is a side view of the VTOL UAV provided by the embodiment of the application.

As shown in FIG. 1 and FIG. 2, this embodiment provides a VTOL UAV, including UAV main body 100 and two rear landing gears 120; the two rear landing gears 120 are fixedly connected to both sides of the rear bottom of the UAV body 100, respectively; the two front landing gears 110 are rotatably connected to both sides of the front bottom of the UAV main body 100, respectively. One end of the front landing gear 110 away from the UAV main body 100 is provided with a locating block 130. Rotating the front landing gear 110 enables the locating block 130 mounted on the front landing gear 110 to get close to or away from the UAV main body 100. The locating block 130 is equipped with a locating component, which can be connected to the ground. The arrangement of two front landing gears 110 and two rear landing gears 120 improves the stress condition of VTOL UAV, so as to reduce the potential safety hazards caused by the excessive bearing capacity of landing gears. The arrangement of the locating block 130 improves the wear resistance of the front landing gear 110. The rotating connection between the front landing gear 110 and the UAV main body 100 facilitates the operator to adjust the spacing between the front bottom of the UAV main body 100 and the ground. The arrangement of the locating component enables the VTOL UAV to be firmly connected to the ground in the non-working state, so as to guarantee the positioning effect of the VTOL UAV and avoid the risk of deviation or overturning of the VTOL UAV.

Figure 3:
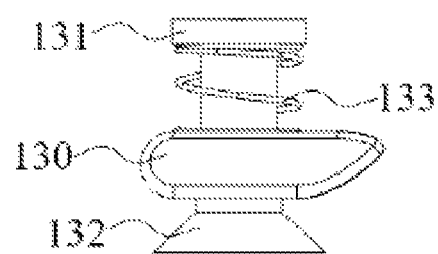
FIG. 3 is the structural diagram of the locating component provided by the embodiment of the application.

As shown in FIG. 3, in this embodiment, the locating component includes a lifting rod 131 and an adsorption unit arranged at the bottom end of the lifting rod 131. The lifting rod 131 can rise or fall relative to the locating block 130, and the adsorption unit can be adsorbed onto the ground. The arrangement of the lifting rod 131 avoids the risk of damage of the adsorption unit in the non-working state and extends the service life of the locating component.

The adsorption unit includes an adsorption suction cup 132 and a vacuumize parts connected to the adsorption suction cup 132, and the vacuumize parts is used to vacuumize. The vacuumize parts includes a piston body. The arrangement of the adsorption suction cup 132 and the piston body ensures that the adsorption unit can be firmly adsorbed onto the ground, so as to ensure the locating effect of the locating component.

The adsorption suction cup 132 is made of silica gel. Silica gel has the advantages of easy cleaning, high temperature resistance, long service life and good insulation.

In this embodiment, the locating component also includes a piston body control unit which is used to control the piston body. The piston body control unit is connected to the piston body through communication. The arrangement of the piston body control unit enables the action of the piston body to be completed automatically, so that the locating operation efficiency of the locating component can be improved.

An avoidance hole is arrangement in the middle of the locating block 130, and the lifting rod 131 passes through the avoidance hole. The arrangement of the lifting rod 131 passing through the avoidance hole further simplifies the structure of the locating block 130.

The locating component also includes a spring 133, which is sleeved with a lifting rod 131, and both ends are connected to the lifting rod 131 and the locating block 130, respectively. The arrangement of the spring 133 enables the adsorption suction cup 132 to be far away from the ground in the non-working state, avoiding the situation that the locating block works in the non-working state. The way that the spring 133 is sleeved with the lifting rod 131 reduces the risk of damage to the spring 133, reduces the maintenance frequency of the UAV, and further simplifies the structure of the locating component.

With continued reference to FIGS. 1 and 2, a locating block 130 is provided at one end of the rear landing gear 120 away from the UAV main body 100. The locating block 130 located on the rear landing gear 120 is also equipped with a locating component. The locating block 130 and the locating component are arranged so that the rear landing gear 120 can also be fixedly connected to the ground, which improves the wear resistance of the rear landing gear 120 and further improves the locating effect of the VTOL UAV.

In other embodiments of the application, a locating iron plate is fixedly connected to the ground, and the locating component includes a lifting rod 131 and an electromagnet arranged at the bottom end of the lifting rod 131. The lifting rod 131 can rise or fall relative to the locating block 130, and the electromagnet can be adsorbed onto the locating iron plate after being energized.

Obviously, the above embodiments of the application are only for the purpose of clarifying the application, but not for the purpose of limiting the embodiments of the application. For those skilled in the art, other changes or alterations in different forms may be made on the basis of the above description. It is unnecessary and impossible to enumerate all the embodiments here. Any modification, equivalent replacement and improvement made based on the spirit and principles of the application shall fall within the breadth and scope of the claims of the application.

What is claimed is:

1. A VTOL (vertical takeoff and landing) UAV (unmanned aerial vehicle), which is characterized by comprising:
    a UAV main body (100);
    two rear landing gears (120), which are fixedly connected to both sides of the rear bottom of the UAV body (100), respectively; and
    two front landing gears (110), which are rotatably connected to both sides of the front bottom of the UAV main body (100), respectively; one end of the front landing gear (110) away from the UAV main body (100) is provided with a locating block (130); rotating the front landing gear (110) enables the locating block (130) installed on the front landing gear (110) to get close to or away from the UAV body (100);
    the locating block (130) is equipped with a locating component, which can be connected to the ground;
    wherein the locating component comprises a lifting rod (131) and an adsorption unit arranged at the bottom end of the lifting rod (131), the lifting rod (131) can rise or fall relative to the locating block (130), and the adsorption unit can be adsorbed onto the ground;
    wherein the adsorption unit comprises an adsorption suction cup (132) and a vacuumize parts connected with the adsorption suction cup (132), and the vacuumize parts is used to vacuumize.

2. The VTOL UAV according to claim 1, which is characterized in that the vacuumize parts further comprises a piston body.

3. The VTOL UAV according to any claim 2, which is characterized in that one end of the rear landing gear (120) away from the UAV body (100) is provided with a locating block (130).

4. The VTOL UAV according to claim 2, which is characterized in that the locating component further comprises a piston body control unit, and the piston body control unit is used to control the piston body.

5. The VTOL UAV according to any claim 4, which is characterized in that one end of the rear landing gear (120) away from the UAV body (100) is provided with a locating block (130).

6. The VTOL UAV according to claim 4, which is characterized in that the piston body control unit is connected to the piston body through communication.

7. The VTOL UAV according to claim 6, which is characterized in that the locating component further comprises a spring (133), the spring (133) is sleeved with the lifting rod (131), and both ends are connected to the lifting rod (131) and the locating block (130), respectively.

8. The VTOL UAV according to any claim 7, which is characterized in that one end of the rear landing gear (120) away from the UAV body (100) is provided with a locating block (130).

9. The VTOL UAV according to any claim 6, which is characterized in that one end of the rear landing gear (120) away from the UAV body (100) is provided with a locating block (130).

10. The VTOL UAV according to claim 1, which is characterized in that an avoidance hole is arranged in the middle of the locating block (130), and the lifting rod (131) passes through the avoidance hole.

11. The VTOL UAV according to any claim 10, which is characterized in that one end of the rear landing gear (120) away from the UAV body (100) is provided with a locating block (130).

12. The VTOL UAV according to claim 1, which is characterized in that the adsorption suction cup (132) is made of silica gel.

13. The VTOL UAV according to any claim 12, which is characterized in that one end of the rear landing gear (120) away from the UAV body (100) is provided with a locating block (130).

14. The VTOL UAV according to any claim 1, which is characterized in that one end of the rear landing gear (120) away from the UAV body (100) is provided with a locating block (130).

15. The VTOL UAV according to any claim 1, which is characterized in that one end of the rear landing gear (120) away from the UAV body (100) is provided with a locating block (130).

16. The VTOL UAV according to any claim 1, which is characterized in that one end of the rear landing gear (120) away from the UAV body (100) is provided with a locating block (130).

\* \* \* \* \*